July 31, 1928.

R. G. WESTBROOK

REVERSIBLE WASTE TRAP

Filed Sept. 19, 1927

1,679,191

Inventor
R. G. Westbrook
By
Attorney

Patented July 31, 1928.

1,679,191

UNITED STATES PATENT OFFICE.

ROBERT G. WESTBROOK, OF BIRMINGHAM, ALABAMA.

REVERSIBLE WASTE TRAP.

Application filed September 19, 1927. Serial No. 220,498.

My invention relates to waste traps, more particularly to non-siphoning waste traps, and has for its object the provision of a simple, effective device of the character designated which shall be positive in sealing and reversible as to installation.

A further object of my invention is to provide a simplified non-siphoning waste trap having improved sealing qualities and which is so constructed that the parts thereof are readily accessible for cleaning.

In apparatus of the prior art, as heretofore known to me, non-siphoning waste traps have been more or less complicated in character. In order to maintain a liquid seal within the waste trap it has heretofore been the practice to provide an elaborate system of baffles within the body of the trap, or to form the body with restricted portions to cooperate with the baffles, in order to insure that sufficient liquid would be beaten back into the body of the trap to maintain a level over the inlet means when the trap was not in action. In forming the baffles for the waste trap of the prior art, great care has been exercised to give them the proper curvature and to cause the liquid to flow through a tortuous path so as to exercise a turning effect on a part of the liquid passing through the trap to create a backward spill of a part of the liquid to insure a seal in the trap.

I have found that the liquid seal of a waste trap may be better established by apparatus much simpler and cheaper of manufacture than that of the prior art and, at the same time, the trap be made reversible so that either end may serve as the inlet or the drain. In the simpler form of my invention, it comprises a cylindrical body closed at both ends and having drain connection openings near each end. In order to insure a non-siphoning action of the trap, a flat disk member is suitably supported midway between the inlet and the outlet. The disk member is preferably spaced a sufficient distance from the outer wall to permit a restricted flow of liquid thereby. Where the siphon action on the trap is particularly strong, I surround the disk member with a cylindrical wall so as to form a relatively large storage chamber directed toward the inlet opening end of the trap, and adapted to refill the lower inlet portion of the trap and seal it when the siphonic action is broken. With this type of piston member, in order to better provide for filling the storage chamber with liquid, the piston member is provided with sufficient restricted passages or openings to permit a slow passage of liquid therethrough when the siphonic action is taking place, and a rapid flow of liquid is taking place around the disk member. When the siphonic action is broken, the liquid flows back by gravity to fill the lower body portion of the trap over the inlet opening.

Apparatus embodying features of my invention is illlustrated in the accompanying drawing, forming a part of this application, wherein Fig. 1 is a longitudinal sectional view of one form of my improved waste trap;

Figure 1:
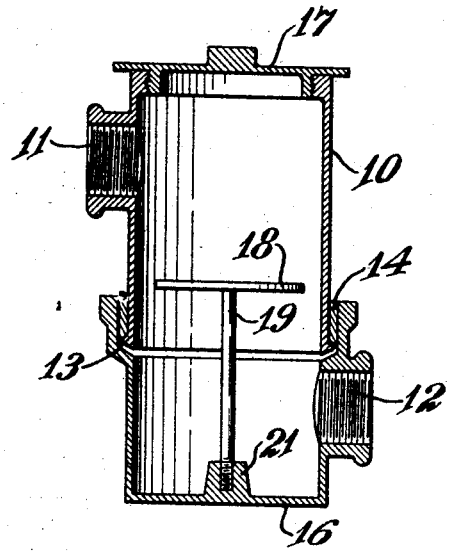

Referring now to Fig. 1, my improved waste trap comprises a body 10 having drain connection openings 11 and 12. When the trap is set up, as shown in the drawing, the lower opening 12 is the inlet opening and the upper opening 11 is the outlet opening. It will be apparent, however, that the trap may be reversed and either opening may be used as the inlet opening. The body portion 10 is provided with a circumferential joint 13 which may be closed by any suitable packing means 14. The lower end of the body 10 has a head 16, while the upper end is provided with a detachable cap 17. Midway between the openings 11 and 12 is a flat disk member 18 supported from a stem 19 which is screwed into a boss 21 formed on the head 16.

The function of the disk member 18 is to restrict the flow of liquid through the trap and create a turbulence beneath it whereby the siphonic action is broken before the trap is emptied and a liquid seal is formed below the disk member 18 and over the inlet 12. This action is assured regardless of which of the openings 11 or 12 is the inlet.

Should it become necessary to clean the trap, the cap 17 is removed, whereupon the disk member 18 may be rotated to unscrew the stem 19 from the boss 21. The interior of the trap may then be readily cleaned.

Figure 2:
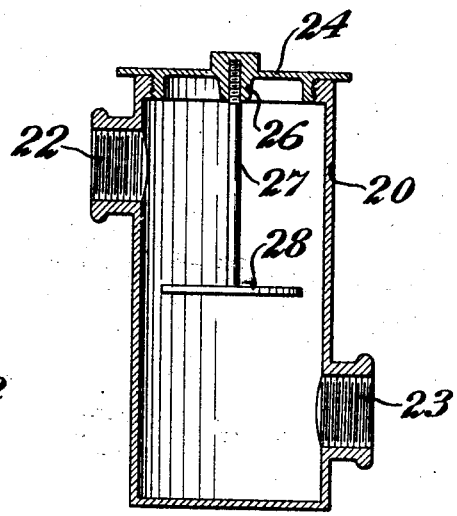
Fig. 2 is a view similar to Fig. 1 and showing a modified form of my improved trap.
Figure 3:
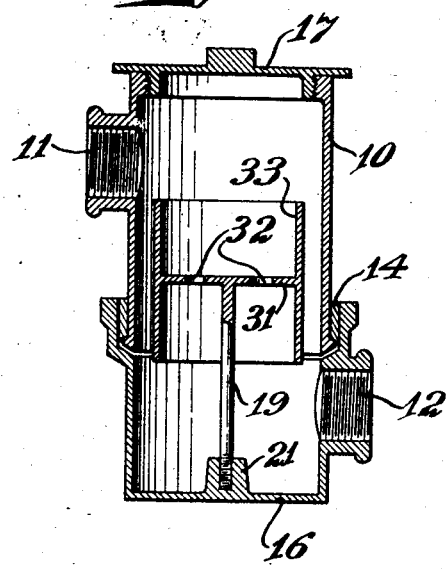
Fig. 3 is a view similar to Fig. 1 and showing the piston member with a cylindrical wall.
Figure 4:
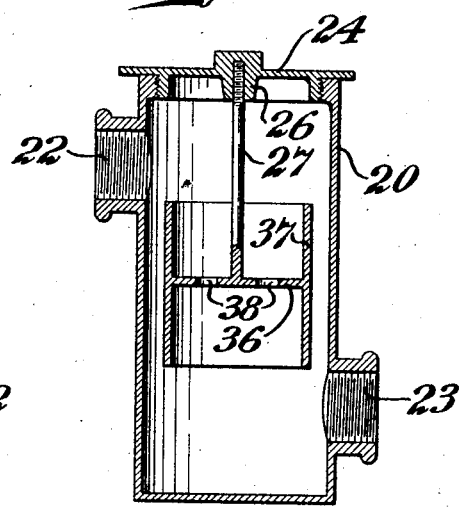
Fig 4 is a view similar to Fig. 2 and showing a piston member similar to that of Fig. 3.

The trap shown in Fig. 2 is similar to that shown in Fig. 1 but is more simple in construction. The trap comprises a solid body 21 having drain connection openings 22 and 23 near the ends thereof. The body portion is closed at the lower end and is provided with a detachable cap 24 at the upper end thereof. The cap 24 is provided with an inwardly projecting boss 26 into which is screwed a stem 27, supporting a disk member 28 midway between the openings 22 and 23. With this form of construction, when the cap 24 is removed, the disk 28 is also removed and the trap may be readily cleaned.

Where the siphonic action of the trap is especially strong, I provide apparatus such as is shown in Figs. 3 and 4. In Fig. 3, the body portion 10 of the trap and the openings 11 and 12 are the same as shown in Fig. 1. In this modification, however, I provide a disk member 31 having restricted openings 32 provided therein, and I surround the disk member 31 with a cylindrical wall 33. The cylindrical wall 33 extends longitudinally of the body on both sides of the disk 31 so as to form a relatively large storage chamber directed toward the inlet of the trap, regardless of whether the opening 11 or the opening 12 is utilized as the inlet. The openings 32 permit a restricted flow of liquid therethrough filling the storage chamber, while a free flow is taking place between the walls and the body of the trap, thus insuring a complete filling of the chamber formed by the cylindrical wall when drainage is taking place. When the siphonic action is broken, the liquid in the chamber flows by gravity back into the lower part of the trap, forming a seal.

The device shown in Fig. 4 is provided with a body portion 20 having drainage openings 22 and 23, similar to those shown in Fig. 2 of the drawing. The disk member shown at 36 is similar to the disk member 31 shown in Fig. 3 and is provided with a cylindrical wall 37 and restricted openings 38 the same as described for the piston 31 of Fig. 3. It is supported, however, in the same manner as the disk 28 of Fig. 2. As in the example shown in Fig. 2, the design shown in Fig. 4 offers certain advantages, where the location permits, in that the cap 24 and piston member 36 may be removed simultaneously for cleaning and without breaking the seal in the trap.

In a series of comparative tests, in actual operation, I have found that my improved waste trap has superior sealing qualities over a number of well known traps now on the market. Furthermore, its simplicity and ease of manufacture, as compared with traps of the prior art, will be at once apparent.

From the foregoing, it will be apparent that I have devised an improved reversible non-siphoning waste trap which is simple of design and easy of manufacture and which is readily accessible for cleaning or repairing.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A non-siphoning waste trap comprising a cylindrical body having an inlet near the bottom and an outlet near the top, both said inlet and said outlet being disposed normal to the longitudinal axis of the body, a detachable cover for one end of the body, a stem extending from one end of the body to the mid portion thereof, and a circular flat disk member carried by the stem, and rigidly supported thereby, said disk permitting a restricted flow of liquid thereby whereby said trap is reversible end for end to locate said cover at the upper or the lower end of said trap when in use.

2. A non-siphoning waste trap comprising a cylindrical body having an inlet near the bottom and an outlet near the top, both said inlet and said outlet being disposed normal to the longitudinal axis of the body, a detachable cover for one end of the body, a flat disk member within the cylindrical body and rigidly secured midway between the inlet and the outlet, said disk member permitting a restricted flow of liquid thereby and being provided with a plurality of restricted openings extending therethrough whereby said trap is reversible end for end to locate said cover at the upper or the lower end of said trap when in use.

3. A non-siphoning waste trap comprising a body having an inlet near the bottom and an outlet near the top, both said inlet and said outlet being disposed normal to the longitudinal axis of the body, a disk member within the cylindrical body and secured midway between the inlet and the outlet, said disk member permitting a restricted flow of liquid thereby and being provided with a plurality of restricted openings extending therethrough, and a wall member provided on the disk to form a storage chamber directed toward the inlet end of the body.

4. A non-siphoning waste trap comprising a body having an inlet near the bottom and an outlet near the top, both said inlet and said outlet being disposed normal to the longitudinal axis of the body, a disk member within the cylindrical body and secured midway between the inlet and the outlet, said disk member permitting a restricted flow of liquid thereby and being provided with a plurality of restricted openings extending therethrough, and a cylindrical wall member surrounding the disk and spaced from the wall of the body.

5. A non-siphoning waste trap comprising a body having an inlet near the bottom and an outlet near the top, both said inlet and said outlet being disposed normal to the longitudinal axis of the body, a disk member within the cylindrical body and secured midway between the inlet and the outlet, said disk member permitting a restricted flow of liquid thereby and being provided with a plurality of restricted openings extending therethrough, and a cylindrical wall member surrounding the disk and spaced from the wall of the body said disk being positioned midway between the ends of the wall member to provide an inverted cup directed toward the end of the body and permitting reversal of the trap.

6. A non-siphoning reversible waste trap comprising a cylindrical body member closed at both ends and having drain connection openings in the sides thereof near each end, a detachable cover for one end of the body, and a flat disk member supported midway between the openings and permitting a restricted flow of liquid thereby whereby said trap is reversible end for end to locate said cover either at the upper end or the lower end of said trap when in use.

7. A non-siphoning reversible waste trap comprising a cylindrical body member closed at both ends and having drain connection openings in the sides thereof near each end, a detachable closure member for one end of the body, a disk member supported from the detachable closure member and permitting a restricted flow of liquid thereby, and a cylindrical wall member surrounding the disk and spaced from the body of the trap to form a storage chamber directed toward the end of the trap serving as the inlet.

8. Apparatus as set forth in claim 7 wherein the disk member is provided with a plurality of restricted openings.

In testimony whereof I, ROBERT G. WESTBROOK, affix my signature.

ROBERT G. WESTBROOK.